United States Patent
Tokura et al.

(10) Patent No.: US 9,416,872 B2
(45) Date of Patent: Aug. 16, 2016

(54) CONTROL APPARATUS FOR VEHICLE

(71) Applicants: Takaaki Tokura, Nagoya (JP); Shogo Matsumoto, Okazaki (JP)

(72) Inventors: Takaaki Tokura, Nagoya (JP); Shogo Matsumoto, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 182 days.

(21) Appl. No.: 14/069,566

(22) Filed: Nov. 1, 2013

(65) Prior Publication Data

US 2014/0129101 A1 May 8, 2014

(30) Foreign Application Priority Data

Nov. 2, 2012 (JP) ................................. 2012-242673

(51) Int. Cl.
*F16H 61/662* (2006.01)

(52) U.S. Cl.
CPC ................................. *F16H 61/66259* (2013.01)

(58) Field of Classification Search
CPC .................. F16H 61/66259; F16H 2061/6605; F16H 2061/6611; F16H 2061/6615; F16H 2061/66218; F16H 61/66227; B60W 10/107; B60W 30/18145

See application file for complete search history.

(56) References Cited

U.S. PATENT DOCUMENTS

| | | | | |
|---|---|---|---|---|
| 6,063,002 A | * | 5/2000 | Nobumoto et al. | 477/41 |
| 7,844,381 B2 | * | 11/2010 | Roudeau et al. | 701/51 |

FOREIGN PATENT DOCUMENTS

| | | |
|---|---|---|
| JP | 2007-177966 A | 7/2007 |
| JP | 2012-107537 A | 6/2012 |
| JP | 2013185696 A | 9/2013 |

* cited by examiner

*Primary Examiner* — Todd Melton
(74) *Attorney, Agent, or Firm* — Kenyon & Kenyon LLP

(57) ABSTRACT

A value correlated with a basic required driving force to be required at re-acceleration is estimated from the deceleration of a decelerating vehicle. A target gear ratio of a CVT is determined from a value obtained by correcting the value correlated with the basic required driving force based on a maximum amount of vehicle speed change at the current time point and an amount of vehicle speed change from the start of a gear ratio control up to the current time point.

6 Claims, 9 Drawing Sheets

CONTROL APPARATUS FOR VEHICLE

CROSS-REFERENCE TO RELATED APPLICATION

This application claims priority under 35 USC 119(a) to Patent Application No. 2012-242673 filed in Japan on Nov. 2, 2012, the entire contents of which are incorporated herein by reference.

BACKGROUND

1. Technical Field

The present invention relates to a control apparatus for a vehicle. Particularly, the present invention relates to measures to provide a suitable driving force to a vehicle equipped with a CVT (continuously variable transmission).

2. Related Art

Vehicles are already known in which an automatic transmission is incorporated into a power train for transmitting power from a drive power source, such as an engine (internal combustion engine), toward drive wheels. In such a vehicle, upon change of the vehicle speed or the like, the gear ratio of the automatic transmission is changed according to a previously stored shift map (see, for example, JP-A No. 2012-107537).

JP-A No. 2007-177966 discloses a technique in which the gear ratio of the automatic transmission of a vehicle while slowing down (decelerating) is determined based on the deceleration of the decelerating vehicle. Specifically, a shift determination region is previously set in a graph with the lateral acceleration and longitudinal acceleration of the vehicle as variables. In the shift determination region, an upshift prohibited zone and a downshift zone are previously defined. The shift determination region contains shift determination values set based on synthetic accelerations each given by a lateral acceleration and a longitudinal acceleration of the decelerating vehicle. If the shift determination value is within the upshift prohibited zone of the determination region (for example, if the vehicle is turning and its lateral acceleration reaches or exceeds a predetermined value), an upshift to the gear ratio obtained from a shift map is prohibited. Thus, the re-accelerability can be ensured. On the other hand, if the shift determination value is within the downshift zone of the determination region (for example, if the vehicle is rapidly slowing down while moving straight and its lateral acceleration is below the predetermined value), a downshift according to the shift map is executed. Thus, the deceleration is increased.

It is preferred that when the vehicle exits corners after turning around them (it transitions from the travel on a curved path to the travel on a straight path), the gear ratio of the automatic transmission should offer a driving force meeting the driver's intention of re-acceleration (a target driving force at re-acceleration). More specifically, even at the same synthetic acceleration during deceleration, the driver's intention of re-acceleration in each case may be different depending upon his/her intention of deceleration (for example, the manner of deceleration). Therefore, gear ratios should preferably be previously set to offer a driving force suitable for the driver's intention of re-acceleration in each case.

In the technique disclosed in JP-A No. 2007-177966, the gear ratio is simply set based on the synthetic acceleration of the decelerating vehicle. In this instance, a driving force suitable for the driver's intention of re-acceleration in each case may not be able to be offered. For example, if a gear ratio not meeting a target driving force at re-acceleration has been set (if a preset gear ratio is below an appropriate value), it is necessary to execute a shift control toward increasing the gear ratio (downshift) by depressing an accelerator pedal at re-acceleration. In doing so, the acceleration response during re-acceleration may not be able to be sufficiently achieved. On the other hand, if a preset gear ratio is above the gear ratio suitable for meeting the target driving force at re-acceleration, the driver may be given a feeling of strangeness from an unexpected response during re-acceleration.

SUMMARY

The present invention provides a control apparatus for a CVT-equipped vehicle which can achieve a suitable gear ratio when the vehicle slows down.

An aspect of the present invention is directed to a control apparatus for a vehicle, the control apparatus performing a gear ratio control for determining a target gear ratio of a CVT configured to transmit power from a drive power source toward a drive wheel. The control apparatus for a vehicle is configured to estimate a basic required driving force to be required at re-acceleration or a value correlated with the basic required driving force from a deceleration of the vehicle while decelerating. Furthermore, the control apparatus for a vehicle is configured to correct the basic required driving force or the value correlated with the basic required driving force based on a maximum amount of vehicle speed change calculated from the deceleration of the vehicle at a current time point and an amount of vehicle speed change from the start of the gear ratio control initiated upon establishment of a predetermined condition for initiating the gear ratio control up to the current time point. Thus, the control apparatus for a vehicle obtains a required driving force to be required at re-acceleration or a value correlated with the required driving force and determines the target gear ratio of the CVT based on the required driving force to be required at re-acceleration or the value correlated with the required driving force.

Another aspect of the present invention relates to a vehicle including a drive power source, a CVT configured to transmit power from the drive power source toward a drive wheel, and a control apparatus for the vehicle configured to control the CVT. In the vehicle, the control apparatus includes an ECU configured to estimate a basic required driving force to be required at re-acceleration or a value correlated with the basic required driving force from a deceleration of the vehicle while decelerating, correct the basic required driving force or the value correlated with the basic required driving force based on a maximum amount of vehicle speed change calculated from the deceleration of the vehicle at a current time point and an amount of vehicle speed change from the start of the gear ratio control initiated upon establishment of a predetermined condition for initiating the gear ratio control up to the current time point to obtain a required driving force to be required at re-acceleration or a value correlated with the required driving force, and determine the target gear ratio of the CVT based on the required driving force to be required at re-acceleration or the value correlated with the required driving force.

With the configuration according to these aspects of the present invention, the basic required driving force or the value correlated with the basic required driving force is corrected based on the maximum amount of vehicle speed change calculated from the deceleration of the vehicle at the current time point and the amount of vehicle speed change to obtain a final required driving force or a value correlated with the final required driving force. Thus, the target gear ratio of the CVT meeting the driver's intention of re-acceleration can be determined. In other words, a gear ratio capable of meeting the target driving force at re-acceleration can be appropriately set, which increases the drivability at re-acceleration.

By way of an example, the maximum amount of vehicle speed change may be calculated based on an assumption that a maximum deceleration in a period from the start of the gear ratio control initiated upon establishment of the predetermined condition for initiating the gear ratio control up to the current time point has continued throughout the period. Furthermore, the amount of vehicle speed change may be calculated as an integral amount of vehicle speed change from the start of the gear ratio control initiated upon establishment of the predetermined condition for initiating the gear ratio control up to the current time point. Moreover, it may be possible to obtain a ratio of the amount of vehicle speed change to the maximum amount of vehicle speed change, multiply the basic required driving force or the value correlated with the basic required driving force by a correction rate calculated based on the ratio to obtain the required driving force to be required at re-acceleration or the value correlated with the required driving force, and determine the target gear ratio of the CVT based on the required driving force to be required at re-acceleration or the value correlated with the required driving force.

In this case, the maximum amount of vehicle speed change and the amount of vehicle speed change, both in the same period, are obtained and the basic required driving force or the value correlated with the basic required driving force is corrected based on the ratio of the amount of vehicle speed change to the maximum amount of vehicle speed change to obtain a final required driving force or a value correlated with the final required driving force. Then, the target gear ratio of the CVT is determined from the final required driving force or the value correlated with the final required driving force. Therefore, the correction rate correctly reflecting the driver's intention of deceleration (correction rate calculated based on the above ratio) can be obtained, so that the final required driving force or the value correlated with the final required driving force can be appropriately obtained. As a result, the target gear ratio of the CVT correctly reflecting the driver's intention of re-acceleration can be determined.

By way of another example, if the target gear ratio of the CVT determined based on the required driving force to be required at re-acceleration or the value correlated with the required driving force is smaller than a previously determined target gear ratio, the previously determined target gear ratio may be retained. This prevents an unnecessary upshift from being executed, so that a good acceleration response during re-acceleration can be ensured.

By way of still another example, during turning of the vehicle in which the lateral acceleration of the vehicle is equal to or larger than a predetermined value, a previously determined target gear ratio may be retained. Thus, the gear shift during turning can be avoided to maintain the stability of the turning vehicle.

By way of still another example, the value correlated with the required driving force may be a rate of the required driving force to a maximum developable driving force at the current time point. Thus, the gear ratio control in the present invention can be applied regardless of vehicle type and engine type to increase the versatility of the control.

By way of still another example, the condition for initiating the gar ratio control may be established when the deceleration of the vehicle reaches or exceeds a predetermined value. In this case, the gear ratio control is started at the point of time when the deceleration of the vehicle has reached or exceeded the predetermined value and thus the driver's intention of deceleration has been confirmed. Therefore, a suitable timing to start the control can be provided, so that the maximum amount of vehicle speed change and the amount of vehicle speed change, both calculated with this timing as a starting point of the control, are suitable.

DETAILED DESCRIPTION

Hereinafter, a description will be given of an embodiment of the present invention with reference to the drawings.

In this embodiment, a description will be given of the case where the present invention is applied to a vehicle equipped with a belt CVT (continuously variable transmission).

Figure 1:
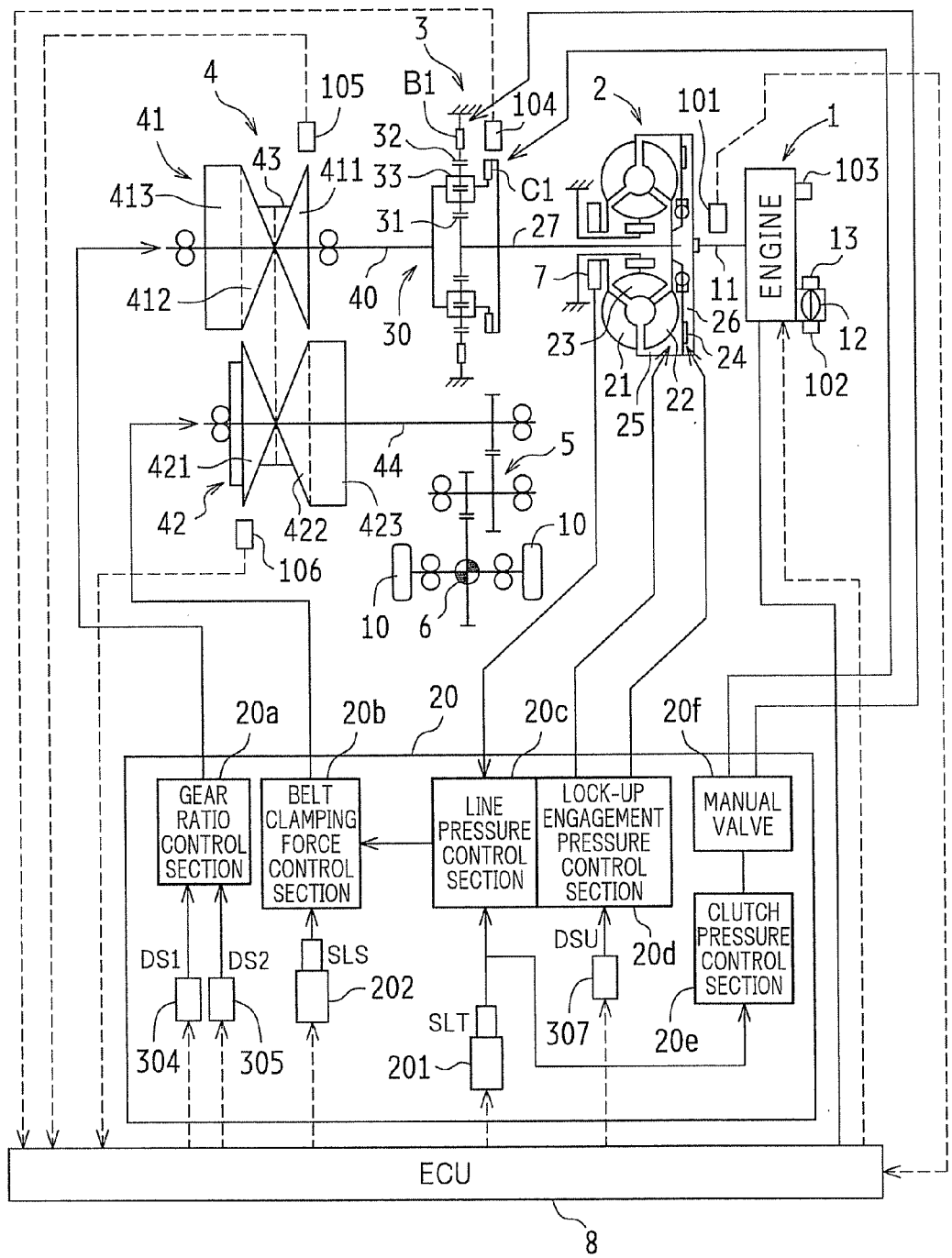
FIG. 1 is a schematic configuration diagram showing an example of a belt CVT-equipped vehicle according to an embodiment.

FIG. 1 is a schematic configuration diagram showing an example of the belt CVT-equipped vehicle according to this embodiment.

The vehicle according to this embodiment is an FF (front engine-front drive) vehicle. The vehicle is equipped with an engine (internal combustion engine) 1 as the drive power source, a torque converter 2 as a fluid drive mechanism, a forward/reverse switching mechanism 3, a belt CVT 4, a reduction gear mechanism 5, a differential gear mechanism 6, an ECU (electronic control unit) 8, and so on. A control apparatus for a vehicle according to the present invention is implemented by a combination of the ECU 8, a hydraulic control circuit 20, a longitudinal acceleration sensor 111, a lateral acceleration sensor 112, and so on all of which will be described later (see FIG. 6).

A crankshaft 11 serving as an output shaft of the engine 1 is coupled to the torque converter 2. The output of the engine 1 is transmitted from the torque converter 2 through the forward/reverse switching mechanism 3, the belt CVT 4, and the reduction gear mechanism 5 to the differential gear mechanism 6 and then distributed to right and left drive wheels 10, 10.

The following description is given of the details of the engine 1, the torque converter 2, the forward/reverse switching mechanism 3, the belt CVT 4, and the ECU 8.

—Engine—

The engine 1 is, for example, a multi-cylinder gasoline engine. The volume of air to be taken in the engine 1 (intake air volume) is controlled by an electronically controlled throttle valve 12. The throttle valve 12 can electronically control the throttle opening independent of the driver's actuation of the accelerator pedal. The opening of the throttle valve 12 (throttle opening) can be detected by a throttle position sensor 102. The temperature of cooling water for the engine 1 can be detected by a water temperature sensor 103.

The throttle opening of the throttle valve 12 can be controlled by the ECU 8. Specifically, the throttle opening is controlled to give an optimal intake air volume (target intake air volume) according to the engine revolution speed Ne detected by an engine speed sensor 101, the amount of depression of the accelerator pedal (amount of actuation of the accelerator pedal; Acc) by the driver, and so on. More specifically, the actual throttle opening of the throttle valve 12 is detected using the throttle position sensor 102. A throttle motor 13 for the throttle valve 12 is feedback-controlled so that the actual throttle opening agrees with the throttle opening capable of achieving the target intake air volume (target throttle opening).

—Torque Converter—

The torque converter 2 includes a pump impeller 21 at the input side, a turbine runner 22 at the output side, a stator 23 having the function of amplifying torque, and so on. The torque converter 2 performs power transmission via a fluid between the pump impeller 21 and the turbine runner 22. The pump impeller 21 is coupled to the crankshaft 11 of the engine 1. The turbine runner 22 is coupled through a turbine shaft 27 to the forward/reverse switching mechanism 3.

The torque converter 2 is provided with a lock-up clutch 24 capable of directly coupling the input side and output side of the torque converter 2. The lock-up clutch 24 can be fully engaged, partly engaged (engaged in slipping conditions), or released by controlling the differential pressure (lock-up differential pressure) between the hydraulic pressure in an engaging chamber 25 of the lock-up clutch 24 and the hydraulic pressure in a releasing chamber 26 thereof.

When the lock-up clutch 24 is fully engaged, the pump impeller 21 and the turbine runner 22 rotate together. When the lock-up clutch 24 is engaged in a predetermined slipping condition (partly engaged position), the turbine runner 22 rotates while following, but with a predetermined amount of slip on, the pump impeller 21. On the other hand, when the lock-up differential pressure is set at a negative value, the lock-up clutch 24 is released.

Furthermore, the torque converter 2 is also provided with a mechanical oil pump (hydraulic pressure source) 7 which is connected to and can be driven by the pump impeller 21.

—Forward/Reverse Switching Mechanism—

The forward/reverse switching mechanism 3 includes a double-pinion planetary gear set 30, a forward clutch C1, and a reverse brake B1.

A sun gear 31 of the planetary gear set 30 is integrally connected to the turbine shaft 27 of the torque converter 2. A carrier 33 of the planetary gear set 30 is integrally connected to an input shaft 40 of the belt CVT 4. The carrier 33 and the sun gear 31 can be connected together by the forward clutch C1. A ring gear 32 of the planetary gear set 30 can be fixed through the reverse brake B1 to a housing of the forward/reverse switching mechanism 3.

The forward clutch C1 and the reverse brake B1 are hydraulic friction engagement elements capable of being engaged and released by a hydraulic control circuit 20 to be described later. When the forward clutch C1 is engaged and the reverse brake B1 is released, the forward/reverse switching mechanism 3 rotates in its entirety to establish a forward power transmission path. In this state, a forward driving force is transmitted toward the belt CVT 4.

On the other hand, when the reverse brake B1 is engaged and the forward clutch C1 is released, the forward/reverse switching mechanism 3 establishes a reverse power transmission path. In this state, the input shaft 40 rotates reversely to the turbine shaft 27 and a reverse driving force thus produced is transmitted toward the belt CVT 4.

When both the forward clutch C1 and the reverse brake B1 are released, the forward/reverse switching mechanism 3 is moved into a neutral position (an interrupted position) in which power transmission is interrupted.

—Belt CVT—

The belt CVT 4 receives power from the engine 1, changes the revolution speed of the input shaft 40, and then transmits the power toward the drive wheels 10, 10. The belt CVT 4 includes a primary pulley 41 at the input side, a secondary pulley 42 at the output side, and a belt 43 made of metal and mounted around the primary pulley 41 and the secondary pulley 42.

The primary pulley 41 is a variable pulley capable of varying its effective diameter. The primary pulley 41 is composed of a fixed sheave 411 fixed to the input shaft 40 and a movable sheave 412 disposed on the input shaft 40 in a manner capable of slide movement thereon only in an axial direction of the input shaft 40.

The secondary pulley 42 is also a variable pulley capable of varying its effective diameter. The secondary pulley 42 is composed of a fixed sheave 421 fixed to an output shaft 44 of the CVT 4 and a movable sheave 422 disposed on the output shaft 44 in a manner capable of slide movement thereon only in an axial direction of the output shaft 44.

A hydraulic actuator 413 is disposed next to the movable sheave 412 of the primary pulley 41. The hydraulic actuator 413 serves to change the width of a V-groove formed between the fixed sheave 411 and the movable sheave 412. On the other hand, a hydraulic actuator 423 is disposed next to the movable sheave 422 of the secondary pulley 42. The hydraulic actuator 423 serves to change the width of a V-groove formed between the fixed sheave 421 and the movable sheave 422.

In the belt CVT 4 having the above structure, by the control of the hydraulic pressure of the hydraulic actuator 413 of the primary pulley 41, the widths of the V-grooves of the primary pulley 41 and the secondary pulley 42 are changed to change the winding diameter (effective diameter) of the belt 43. Thus, the gear ratio $\gamma$ ($\gamma$=(primary pulley revolution speed (input shaft revolution speed) Nin)/(secondary pulley revolution speed (output shaft revolution speed) Nout)) continuously changes. Furthermore, the hydraulic pressure of the hydraulic actuator 423 of the secondary pulley 42 is controlled so that the belt 43 can be clamped with a predetermined clamping force that will not cause belt slip. These hydraulic pressure controls are effected by the ECU 8 and the hydraulic control circuit 20.

—Hydraulic Control Circuit—

The hydraulic control circuit 20 is constituted by a gear ratio control section 20a, a belt clamping force control section 20b, a line pressure control section 20c, a lock-up engagement pressure control section 20d, a clutch pressure control section 20e, a manual valve 20f, and so on.

The ECU 8 is configured to send control signals to solenoids constituting part of the hydraulic control circuit 20, i.e., a shift control solenoid (DS1) 304 and a shift control solenoid (DS2) 305 both for gear ratio control; a linear solenoid (SLS) 202 for belt clamping force control; a linear solenoid (SLT) 201 for line pressure control; and a duty solenoid (DSU) 307 for lock-up engagement pressure control.

Figure 2:
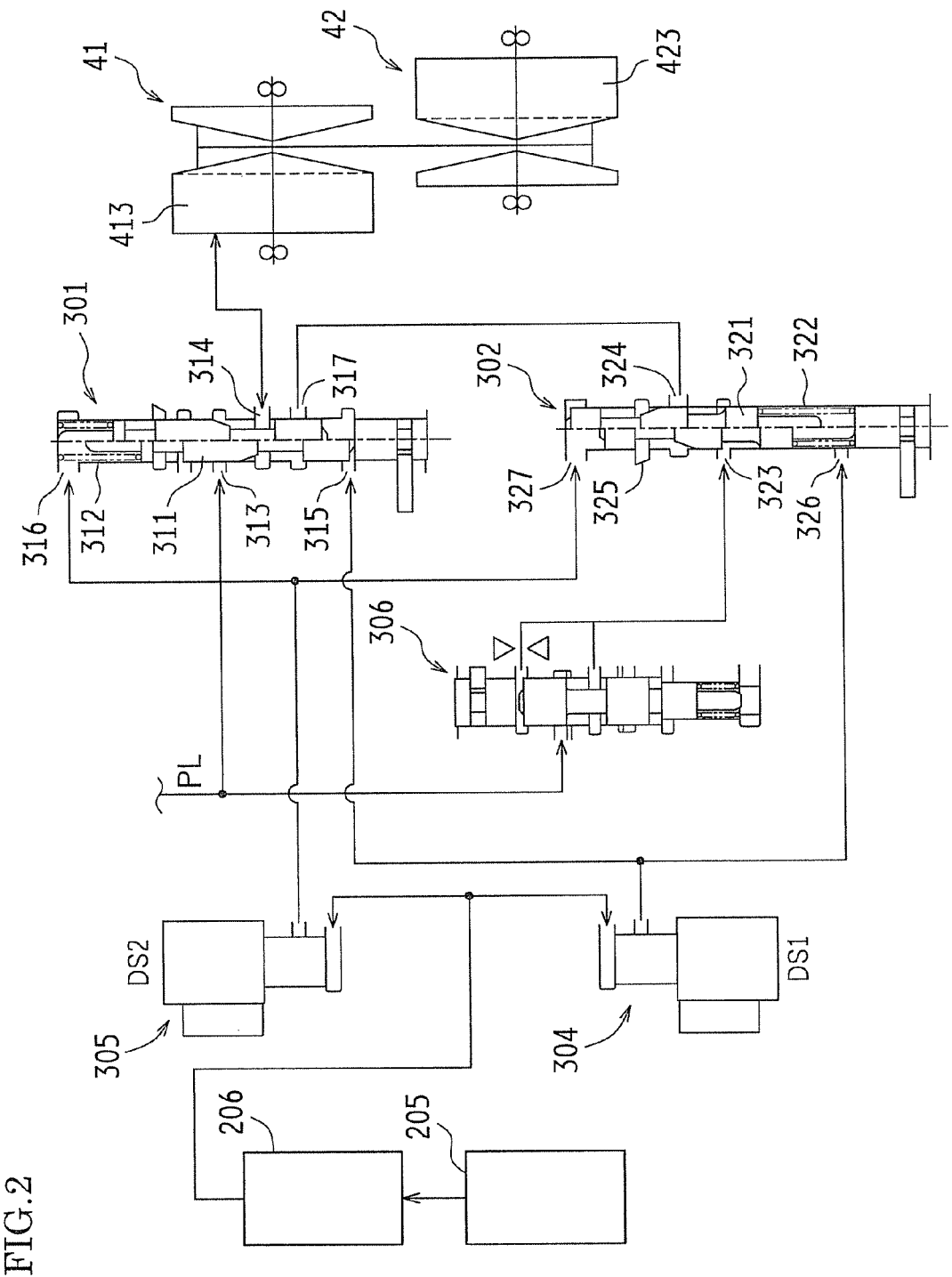
FIG. 2 is a configuration diagram of a portion of a hydraulic control circuit in which a hydraulic actuator of a primary pulley is controlled.
Figure 3:
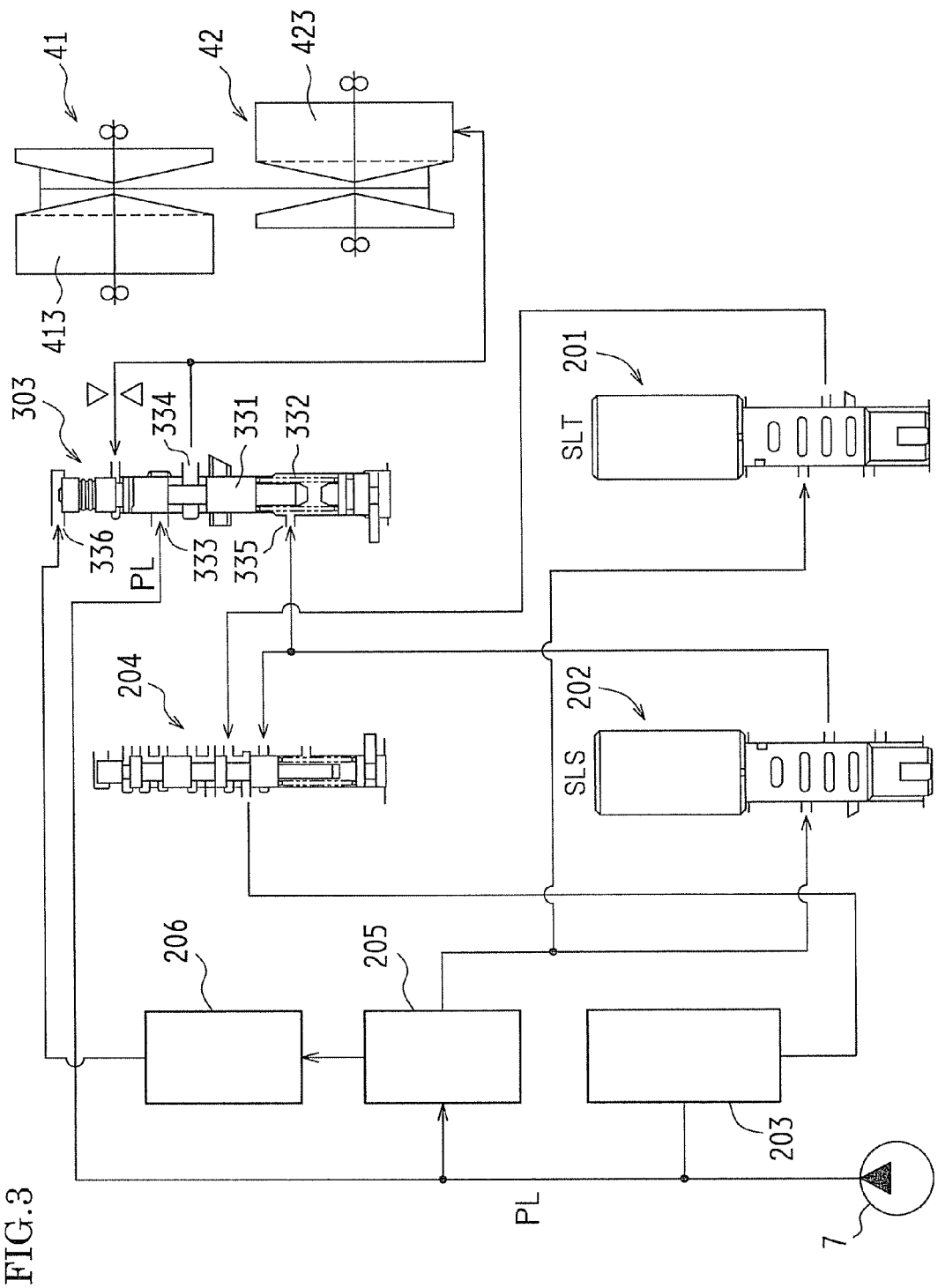
FIG. 3 is a configuration diagram of a portion of the hydraulic control circuit in which the belt clamping force is controlled.

With reference to FIGS. 2 and 3, a description will be given below of a hydraulic control circuit portion of the hydraulic control circuit 20 for the hydraulic actuator 413 of the primary pulley 41 (a specific hydraulic circuit configuration of the gear ratio control section 20a) and a hydraulic control circuit portion of the hydraulic control circuit 20 for the hydraulic actuator 423 of the secondary pulley 42 (a specific hydraulic circuit configuration of the belt clamping force control section 20b). The hydraulic control circuit shown in FIGS. 2 and 3 is merely illustrative. The hydraulic control circuit applicable to the present invention is not limited to that shown in the figures and includes various forms.

Referring first to FIG. 3, the hydraulic pressure generated by the oil pump 7 is adjusted by a primary regulator valve 203 to produce a line pressure PL. A control hydraulic pressure output from the linear solenoid (SLT) 201 is provided through a clutch apply control valve 204 to the primary regulator valve 203. The primary regulator valve 203 is actuated by the control hydraulic pressure serving as a pilot pressure.

Alternatively, a control hydraulic pressure from the linear solenoid (SLS) 202 may be provided to the primary regulator valve 203 by switching the flow path of the clutch apply control valve 204, so that the control hydraulic pressure may act as a pilot pressure for the primary regulator valve 203 to produce the line pressure PL. A hydraulic pressure modulated from the line pressure PL by a modulator valve 205 is provided to the linear solenoid (SLT) 201 and the linear solenoid (SLS) 202.

The linear solenoid (SLT) 201 outputs the control hydraulic pressure according to the electric current value depending upon a duty signal output from the ECU 8. The linear solenoid (SLT) 201 is a normally open solenoid valve.

The linear solenoid (SLS) 202 outputs the control hydraulic pressure according to the electric current value depending upon a duty signal output from the ECU 8. The linear solenoid (SLS) 202 is also a normally open solenoid valve.

In the hydraulic control circuit shown in FIGS. 2 and 3, a modulator valve 206 modulates the hydraulic pressure output from the modulator valve 205 to a certain pressure and provides the modulated pressure to a shift control solenoid (DS1) 304, a shift control solenoid (DS2) 305, and a belt clamping force control valve 303, all of which will be described later.

<Shift Control>

Next, a description will be given of the hydraulic control circuit portion for the hydraulic actuator 413 of the primary pulley 41. As shown in FIG. 2, the hydraulic actuator 413 of the primary pulley 41 is connected to an upshift control valve 301.

The upshift control valve 301 is provided with an axially movable spool 311. A spring 312 is disposed in one end portion of the upshift control valve 301 near to one end of the spool 311 (the upper end thereof in FIG. 2). A first hydraulic port 315 is formed in the other end portion of the upshift control valve 301 opposite to the spring 312 with the spool 311 in between. Furthermore, a second hydraulic port 316 is formed in the one end portion of the upshift control valve 301 in which the spring 312 is disposed.

The first hydraulic port 315 is connected to the shift control solenoid (DS1) 304 configured to output the control hydraulic pressure according to the electric current value depending upon a duty signal (DS1 shift duty (upshift duty)) output from the ECU 8. The control hydraulic pressure output from the shift control solenoid (DS1) 304 is applied to the first hydraulic port 315. The second hydraulic port 316 is connected to the shift control solenoid (DS2) 305 configured to output the control hydraulic pressure according to the electric current value depending upon a duty signal (DS2 shift duty (downshift duty)) output from the ECU 8. The control hydraulic pressure output from the shift control solenoid (DS2) 305 is applied to the second hydraulic port 316.

Furthermore, the upshift control valve 301 has an input port 313 through which the line pressure PL is provided, an input/output port 314 connected to (communicated with) the hydraulic actuator 413 of the primary pulley 41, and an output port 317. When the spool 311 is in an upshift position (a right position in FIG. 2), the output port 317 is closed, so that the line pressure PL is provided through the input port 313 and the input/output port 314 to the hydraulic actuator 413 of the primary pulley 41. On the other hand, when the spool 311 is in a closed position (a left position in FIG. 2), the input port 313 is closed, so that the hydraulic actuator 413 of the primary pulley 41 is communicated through the input/output port 314 with the output port 317.

A downshift control valve 302 of the hydraulic control circuit 20 is provided with an axially movable spool 321. A spring 322 is disposed in one end portion of the downshift control valve 302 near to one end of the spool 321 (the lower end thereof in FIG. 2). Furthermore, a first hydraulic port 326 is formed in the one end portion of the downshift control valve 302. A second hydraulic port 327 is formed in the other end portion of the downshift control valve 302 opposite to the spring 322 with the spool 321 in between.

The first hydraulic port 326 is connected to the shift control solenoid (DS1) 304. The control hydraulic pressure output from the shift control solenoid (DS1) 304 is applied to the first hydraulic port 326. The second hydraulic port 327 is connected to the shift control solenoid (DS2) 305. The control hydraulic pressure output from the shift control solenoid (DS2) 305 is applied to the second hydraulic port 327.

Furthermore, an input port 323, an input/output port 324, and a discharge port 325 are formed in the downshift control valve 302. The input port 323 is connected to a bypass control valve 306. The hydraulic pressure modulated from the line pressure PL by the bypass control valve 306 is provided to the input port 323. When the spool 321 of the downshift control valve 302 is in a downshift position (a left position in FIG. 2), the input/output port 324 is communicated with the discharge port 325. On the other hand, when the spool 321 is in a closed position (a right position in FIG. 2), the input/output port 324 is closed. The input/output port 324 of the downshift control valve 302 is connected to the output port 317 of the upshift control valve 301.

In the above hydraulic control circuit portion shown in FIG. 2, when the shift control solenoid (DS1) 304 is actuated according to a DS1 shift duty (upshift command) output from the ECU 8 and the control hydraulic pressure output from the shift control solenoid (DS1) 304 is thus provided to the first hydraulic port 315 of the upshift control valve 301, the spool 311 is moved toward the upshift position side (the upper side in FIG. 2) by a thrust depending upon the control hydraulic pressure. By this movement of the spool 311 (toward the upshift position side), working fluid (the line pressure PL) is supplied, in a flow volume corresponding to the control hydraulic pressure, through the input port 313 and the input/ output port 314 to the hydraulic actuator 413 of the primary pulley 41 and the output port 317 is closed to interrupt flow of the working fluid to the downshift control valve 302. Thus, the shift control pressure is increased, so that the width of the V-groove of the primary pulley 41 is reduced to reduce the gear ratio γ (upshift).

When the control hydraulic pressure output from the shift control solenoid (DS1) 304 is provided to the first hydraulic port 326 of the downshift control valve 302, the spool 321 is moved toward the upper side in FIG. 2 to close the input/output port 324.

On the other hand, when the shift control solenoid (DS2) 305 is actuated according to a DS2 shift duty (downshift command) output from the ECU 8 and the control hydraulic pressure output from the shift control solenoid (DS2) 305 is thus provided to the second hydraulic port 316 of the upshift control valve 301, the spool 311 is moved toward the downshift position side (the lower side in FIG. 2) by a thrust depending upon the control hydraulic pressure. By this movement of the spool 311 (toward the downshift position side), the working fluid in the hydraulic actuator 413 of the primary pulley 41 flows, in a flow volume corresponding to the control hydraulic pressure, into the input/output port 314 of the upshift control valve 301. The working fluid having flowed into the upshift control valve 301 passes through the output port 317 and the input/output port 324 of the downshift control valve 302 and is then discharged through the discharge port 325. Thus, the shift control pressure is reduced, so that the width of the V-groove of the primary pulley 41 is increased to increase the gear ratio γ (downshift).

When the control hydraulic pressure output from the shift control solenoid (DS2) 305 is provided to the second hydraulic port 327 of the downshift control valve 302, the spool 321 is moved toward the lower side in FIG. 2 to communicate the input/output port 324 with the discharge port 325.

As seen from the above, when the control hydraulic pressure is output from the shift control solenoid (DS1) 304, the working fluid is supplied via the upshift control valve 301 to the hydraulic actuator 413 of the primary pulley 41 to continuously change the shift control pressure and upshift the CVT 4. On the other hand, when the control hydraulic pressure is output from the shift control solenoid (DS2) 305, the working fluid in the hydraulic actuator 413 of the primary pulley 41 is discharged through the discharge port 325 of the downshift control valve 302 to continuously change the shift control pressure and downshift the CVT 4.

Figure 4:
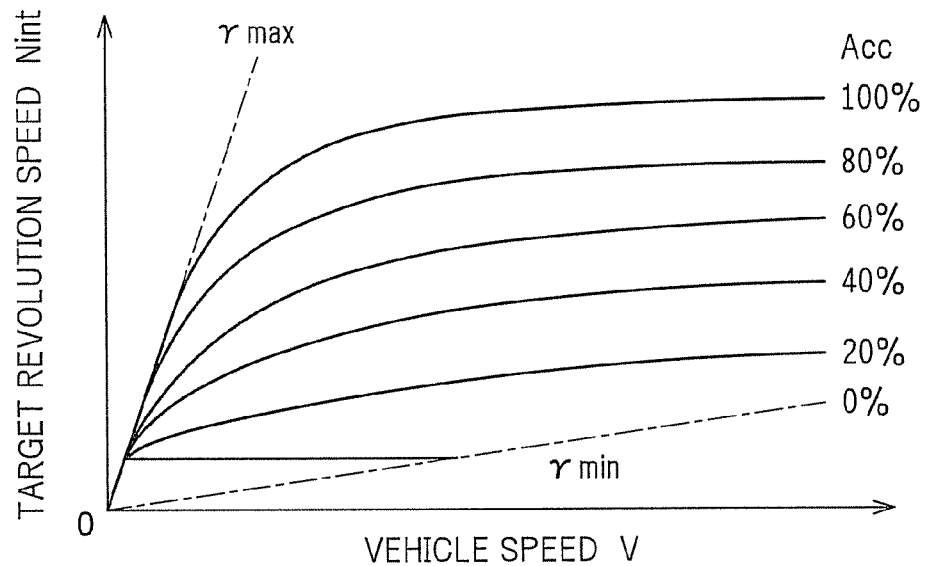
FIG. 4 is a graph showing an example of a map for use in shift control of the belt CVT.

Furthermore, in this embodiment, as shown for example in FIG. 4, a target input revolution speed Nint is calculated from a shift map previously set with the amount Acc of accelerator pedal actuation representing the amount of power output required by the driver and the vehicle speed V as parameters and the shift control of the belt CVT 4 is performed according to the deviation (Nint−Nin) of the actual input shaft revolution speed Nin from the target input revolution speed Nint, i.e., so that the actual input shaft revolution speed Nin agrees with the target input revolution speed Nint. Specifically, the shift control pressure is controlled by supplying or discharging the working fluid to or from the hydraulic actuator 413 of the primary pulley 41, so that the gear ratio γ continuously changes. The map shown in FIG. 4 corresponds to shift conditions of the vehicle and is stored in a ROM 82 (see FIG. 6) of the ECU 8.

In the map of FIG. 4, the target input revolution speed Nint is set so that a lower vehicle speed V and a larger amount Acc of accelerator pedal actuation give a larger gear ratio γ. Furthermore, the vehicle speed V is associated with the secondary pulley revolution speed (output shaft revolution speed) Nout. Therefore, the target input revolution speed Nint as the target value of the primary pulley revolution speed (input shaft revolution speed) Nin is associated with the target gear ratio and is set within the range from the minimum gear ratio γmin to the maximum gear ratio γmax of the belt CVT 4.

<Belt Clamping Force Control>

Next, a description will be given of the hydraulic control circuit portion for the hydraulic actuator 423 of the secondary pulley 42 with reference to FIG. 3.

As shown in FIG. 3, the hydraulic actuator 423 of the secondary pulley 42 is connected to the belt clamping force control valve 303.

The belt clamping force control valve 303 is provided with an axially movable spool 331. A spring 332 is disposed in one end portion of the belt clamping force control valve 303 near to one end of the spool 331 (the lower end thereof in FIG. 3). Furthermore, a first hydraulic port 335 is formed in the one end portion of the belt clamping force control valve 303. A second hydraulic port 336 is formed in the other end portion of the belt clamping force control valve 303 opposite to the spring 332 with the spool 331 in between.

The first hydraulic port 335 is connected to the linear solenoid (SLS) 202. The control hydraulic pressure output from the linear solenoid (SLS) 202 is applied to the first hydraulic port 335. The hydraulic pressure from the modulator valve 206 is applied to the second hydraulic port 336.

Furthermore, the belt clamping force control valve 303 has an input port 333 through which the line pressure PL is provided, and an output port 334 connected to (communicated with) the hydraulic actuator 423 of the secondary pulley 42.

In the hydraulic control circuit portion shown in FIG. 3, when the control hydraulic pressure output from the linear solenoid (SLS) 202 is increased in a state that a predetermined hydraulic pressure is given to the hydraulic actuator 423 of the secondary pulley 42, the spool 331 of the belt clamping force control valve 303 is moved toward the upper side in FIG. 3. In this case, the hydraulic pressure provided to the hydraulic actuator 423 of the secondary pulley 42 is increased to increase the belt clamping force.

On the other hand, when the control hydraulic pressure output from the linear solenoid (SLS) 202 is reduced in the state that the predetermined hydraulic pressure is given to the hydraulic actuator 423 of the secondary pulley 42, the spool 331 of the belt clamping force control valve 303 is moved toward the lower side in FIG. 3. In this case, the hydraulic pressure provided to the hydraulic actuator 423 of the secondary pulley 42 is reduced to reduce the belt clamping force.

In this manner, the control hydraulic pressure output from the linear solenoid (SLS) 202 acts as a pilot pressure to adjust the line pressure PL and the adjusted hydraulic pressure is provided to the hydraulic actuator 423 of the secondary pulley 42 to increase or reduce the belt clamping force.

Figure 5:
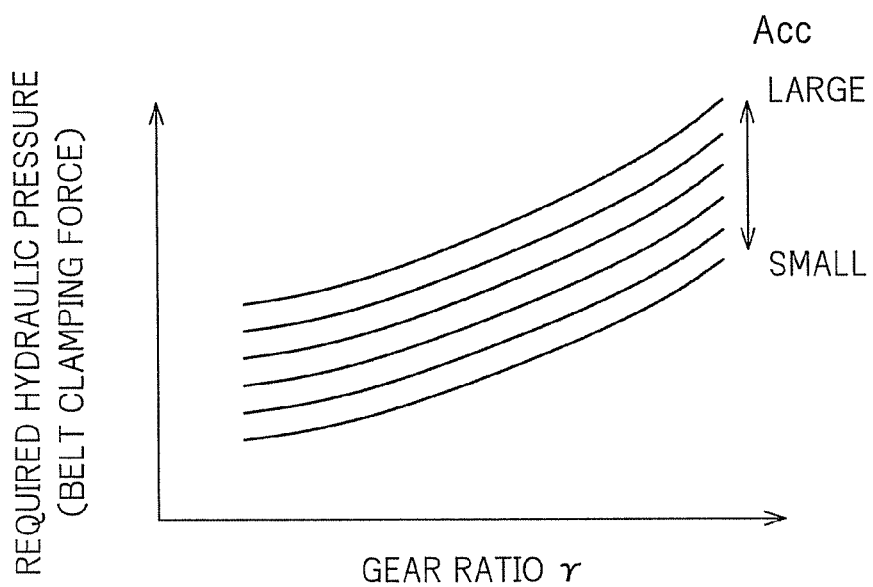
FIG. 5 is a graph showing an example of a map for use in control of the belt clamping force of the belt CVT.

Furthermore, in this embodiment, as shown for example in FIG. 5, the control hydraulic pressure to be output from the linear solenoid (SLS) 202 is controlled according to a map of required hydraulic pressure (corresponding to the belt clamping force) previously set, with the amount Acc of accelerator pedal actuation corresponding to the transmission torque and the gear ratio γ (γ=Nin/Nout) as parameters, to avoid the occurrence of belt slip. Thus, the belt clamping force of the belt CVT 4, i.e., the hydraulic pressure of the hydraulic actuator 423 of the secondary pulley 42, is adjusted and controlled. The map shown in FIG. 5 corresponds to clamping force control conditions and is stored in the ROM 82 (see FIG. 6) of the ECU 8.

—ECU—

Figure 6:
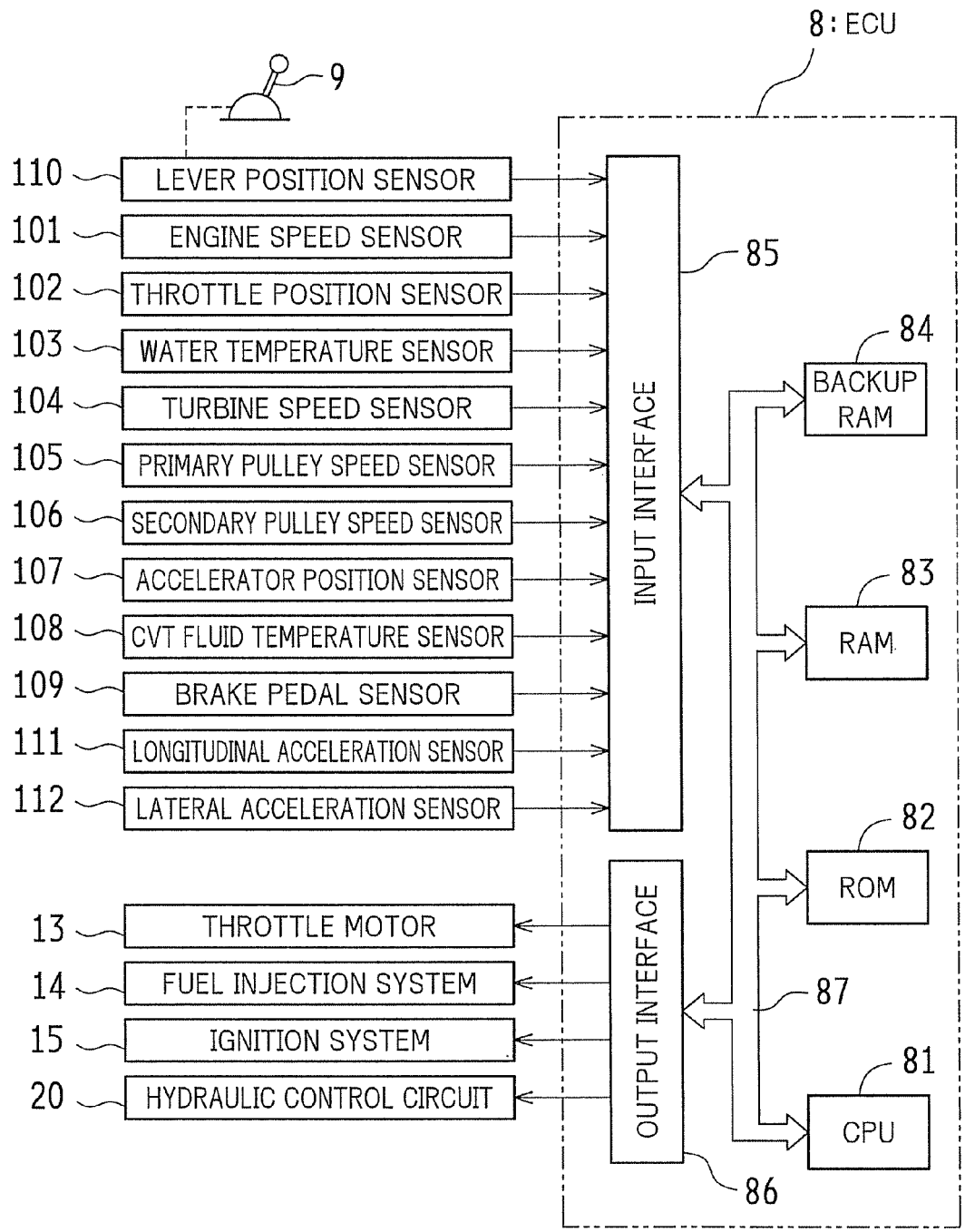
FIG. 6 is a block diagram showing the architecture of a control system including an ECU.

The ECU 8, as shown in FIG. 6, includes a CPU 81, the ROM 82, a RAM 83, a backup RAM 84, and so on.

The ROM 82 stores various control programs and maps that will be referred to in running the control programs. The CPU 81 performs processings based on the various control programs and maps stored in the ROM 82. The RAM 83 is a memory capable of temporarily storing calculation results in the CPU 81 and data input from sensors. The backup RAM 84 is a non-volatile memory capable of storing data to be saved upon shutdown of the engine 1.

The CPU 81, the ROM 82, the RAM 83, and the backup RAM 84 are connected via a bus 87 to each other, as well as to an input interface 85 and an output interface 86.

The input interface 85 of the ECU 8 is connected to the engine speed sensor 101, the throttle position sensor 102, the water temperature sensor 103, a turbine speed sensor 104, a primary pulley speed sensor 105, a secondary pulley speed sensor 106, an accelerator position sensor 107, a CVT fluid temperature sensor 108, a brake pedal sensor 109, a lever position sensor 110, a longitudinal acceleration sensor 111, a lateral acceleration sensor 112, and so on. The lever position sensor 110 detects the lever position (operation position) of a shift lever 9. The longitudinal acceleration sensor 111 detects the acceleration of the vehicle in the longitudinal direction. The lateral acceleration sensor 112 detects the acceleration of the vehicle in the lateral direction. The output signals of these sensors are sent to the ECU 8. The output signals include signals indicating the revolution speed Ne of the engine 1 (engine speed), the throttle opening θth of the throttle valve 12, the temperature Tw of cooling water in the engine 1, the revolution speed Nt of the turbine shaft 27 (turbine speed), the primary pulley revolution speed (input shaft revolution speed) Nin, the secondary pulley revolution speed (output shaft revolution speed) Nout, the amount Acc of actuation of the accelerator pedal (accelerator opening), the fluid temperature Thc in the hydraulic control circuit 20 (CVT fluid temperature), whether or not a foot brake as a service brake has been actuated (brake ON/OFF), the lever position (operation position) of the shift lever 9, the acceleration of the vehicle in the longitudinal direction, and the acceleration of the vehicle in the lateral direction.

The output interface 86 is connected to the throttle motor 13, a fuel injection system 14, an ignition system 15, the hydraulic control circuit 20, and so on.

Among the various types of signals to be sent to the ECU 8, the turbine speed Nt agrees with the primary pulley revolution speed (input shaft revolution speed) Nin at the forward travel in which the forward clutch C1 of the forward/reverse switching mechanism 3 is engaged. Furthermore, the secondary pulley revolution speed (output shaft revolution speed) Nout is associated with the vehicle speed V. Moreover, the amount Acc of accelerator pedal actuation represents the amount of power output required by the driver.

The shift lever 9 can be selectively operated into several positions, including a parking position "P" for parking, a reverse position "R" for reverse travel, a neutral position "N" for interrupting power transmission, a drive position "D" for forward travel, and a manual position "M" where the gear ratio γ of the belt CVT 4 can be manually increased and reduced during forward travel.

The manual position "M" is provided with downshift and upshift positions for increasing and reducing the gear ratio γ or provided with a plurality of range positions in which the driver can select any one of different shift ranges having different highest speeds (smallest gear ratios γ).

The lever position sensor 110 includes a plurality of ON/OFF switches which serves to detect that the shift lever 9 has been operated into, for example, the parking position "P", the reverse position "R", the neutral position "N", the drive position "D", the manual position "M", the upshift position, the downshift position or each of the range positions. In order to manually change the gear ratio γ, besides the shift lever 9, a downshift switch or lever and an upshift switch or lever may be provided, for example, on a steering wheel.

The ECU 8 performs, based on the output signals from the aforementioned various types of sensors, the output control of the engine 1, the aforementioned shift control (gear ratio control) and belt clamping force control of the belt CVT 4, the engagement/release control of the lock-up clutch 24, and so on. The output control of the engine 1 is effected by the throttle motor 13, the fuel injection system 14, the ignition system 15, the ECU 8, and so on. The ECU 8 further performs a "gear ratio control during vehicle deceleration" to be described below.

—Gear Ratio Control During Vehicle Deceleration—

Next, a description will be given of a gear ratio control during vehicle deceleration which is an operation characterizing this embodiment. The gear ratio control during vehicle deceleration is a control for achieving a gear ratio γ of the belt CVT 4 capable of offering a driving force that will be required at re-acceleration.

Even at the same maximum deceleration during vehicle deceleration (hereinafter, also referred to as "deceleration peak G"), the driver's intention of re-acceleration in each case may be different depending upon his/her intention of deceleration (for example, the manner of deceleration up to that point of time). For example, even at the same deceleration peak G, a pattern of deceleration in a relatively short time indicates driver's stronger intention of deceleration and stronger intention of re-acceleration than a pattern of deceleration in a relatively long time. Therefore, if the gear ratio γ of the belt CVT 4 is simply set according only to the required driving force to be required at re-acceleration (hereinafter referred to as the required re-acceleration driving force) obtained based on the deceleration peak G, the resultant gear ratio γ may be one not meeting the driver's intention of re-acceleration. In such an instance, an additional change in gear ratio (change toward increasing the gear ratio; downshift) may have to be carried out by depressing the accelerator pedal at re-acceleration or, to the contrary, an excessively large gear ratio may be selected to give the driver a feeling of strangeness during re-acceleration. In addition, such an excessively large gear ratio means that an unnecessary shift control has been performed during deceleration.

To cope with the above problems, in this embodiment, a gear ratio control during vehicle deceleration is performed in which not only a gear ratio γ of the belt CVT 4 is determined according to the shift map shown in FIG. 4 but also a gear ratio ("target gear ratio" in the present invention) γ of the belt CVT 4 is determined based on a final required re-acceleration driving force obtained by correcting the required re-acceleration driving force obtained from the deceleration peak G.

Prior to the description of the above gear ratio control during vehicle deceleration, the states of the vehicle during turning are described.

The deceleration peak G of the vehicle approaching corners in preparation for turning around them correlates with the required re-acceleration driving force (for example, the driving force required by the driver corresponding to the amount of depression of the accelerator pedal at re-acceleration). Specifically, experimental verification has shown that as the deceleration peak G increases, the required re-acceleration driving force also increases.

Figure 7:
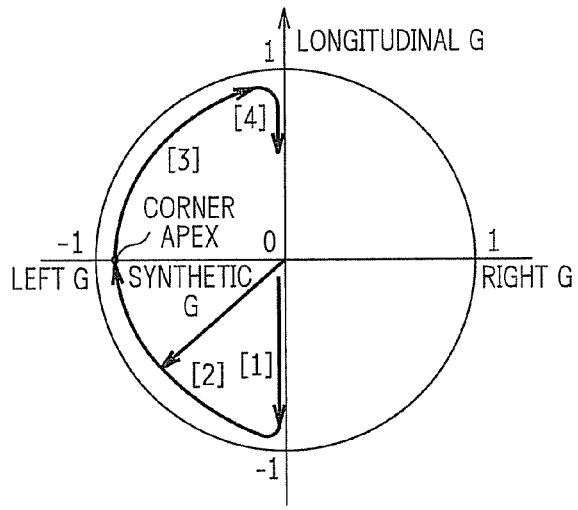
FIG. 7 is a graph showing changes in longitudinal G and lateral G acting on the vehicle while turning.
Figure 8:
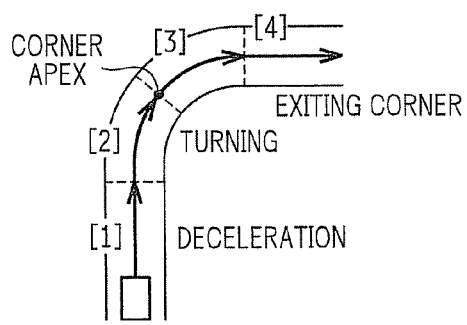
FIG. 8 is a diagram showing sections of a path of travel when the vehicle turns.
Figure 9:
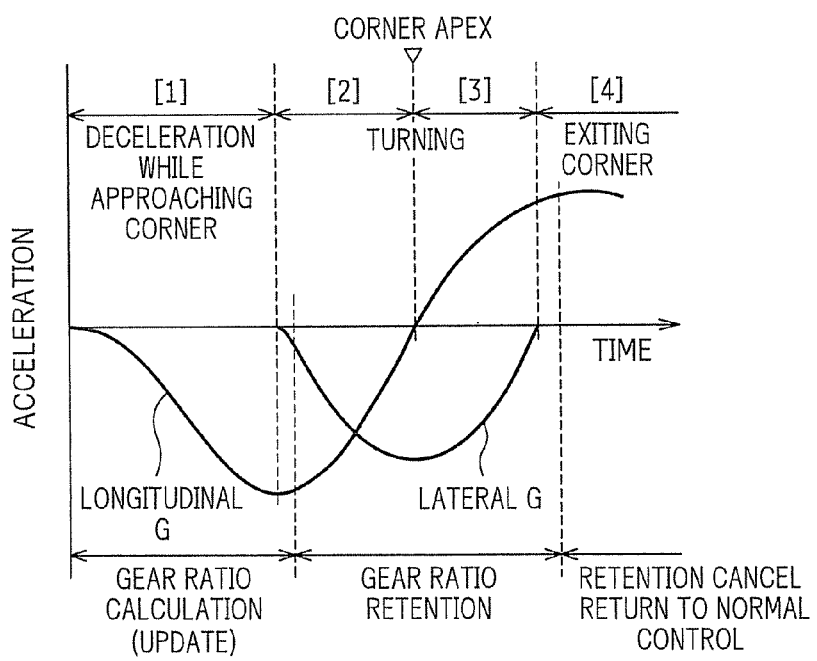
FIG. 9 is a chart in which changes in longitudinal G and lateral G in the individual sections are expressed along the time axis.

FIG. 7 shows changes in longitudinal G (acceleration in the longitudinal direction of the vehicle body) and lateral G (acceleration in the lateral direction of the vehicle body) acting on the vehicle while turning (while clockwise turning in this figure). FIG. 8 is a diagram showing sections [1] to [4] of a path of travel when the vehicle turns. FIG. 9 is a chart in which changes in longitudinal G and lateral G in the individual sections [1] to [4] are expressed along the time axis.

As shown in FIGS. 7 to 9, the path of travel from approach to a corner, then passage through it, and to exiting from it (re-acceleration) can be roughly divided into four sections. Specifically, the path of travel can be divided into section [1] where the vehicle decelerates in preparation for entry to the corner, section [2] from the entry to the corner to the corner apex, section [3] from the corner apex to the corner exit, and section [4] where the vehicle re-accelerates past the corner exit.

Referring to FIGS. 7 to 9, while the vehicle is approaching the corner, i.e., in section [1], the longitudinal G is exclusively a deceleration G and substantially no lateral G is generated. While the vehicle is turning around the corner, i.e., in sections [2] and [3], a synthetic acceleration (also referred to as synthetic G) of a longitudinal G and a lateral G is generated. In this case, for example, the lateral G is maximized at the boundary between sections [2] and [3] (at the corner apex). While the vehicle is exiting the corner, i.e., in section [4], the longitudinal G is exclusively an acceleration G and substantially no lateral G is generated. Furthermore, the maximum value (maximum deceleration) of the longitudinal G (deceleration G) in section [1] continues to be updated until the vehicle enters the corner (section [2] is reached) (see FIG. 9).

In this embodiment, the maximum deceleration being updated in the above manner is detected at specified intervals and at each detection of the maximum deceleration the required re-acceleration driving force is obtained based on the maximum deceleration. Then, the required re-acceleration driving force is corrected to obtain a final required re-acceleration driving force and the gear ratio γ of the belt CVT 4 meeting the driver's intention of re-acceleration is determined from the final required re-acceleration driving force. In other words, at every updating of the maximum deceleration, the gear ratio γ of the belt CVT 4 is determined and the belt CVT 4 is controlled to achieve the determined gear ratio γ.

The required re-acceleration driving force obtained based on the maximum deceleration may be expressed, for example, by the absolute value of the required driving force. However, in view of suitability for each vehicle type, the required re-acceleration driving force is preferably expressed, for example, by the rate of "target driving force at re-acceleration" estimated to be required at the exiting from the corner with respect to "maximum developable driving force" at the vehicle speed V, the engine torque or the like at that time point (hereinafter referred to as the required rate η [%] of re-acceleration driving force). The gear ratio control during vehicle deceleration in this embodiment is performed to obtain a gear ratio γ of the belt CVT 4 capable of achieving the above required rate η of re-acceleration driving force (specifically, a final required rate ηmod of re-acceleration driving force which will be described later).

Specifically, in the gear ratio control during vehicle deceleration in this embodiment, first, a basic required rate η of re-acceleration driving force ("the value correlated with the basic required driving force" in the present invention) is obtained as a basic required driving force at re-acceleration from the vehicle deceleration ("the estimation of the value correlated with the basic required driving force" in the present invention). Furthermore, the correction rate ε for the basic required rate η of re-acceleration driving force is calculated based on the maximum amount ΔVmax of vehicle speed change calculated from the deceleration peak G at a current time point and the integral amount ΔV of vehicle speed change from the start of the gear ratio control during vehicle deceleration up to the current time point (=∫G(t)dt; "the amount of vehicle speed change" in the present invention). Then, the above basic required rate η of re-acceleration driving force is corrected by multiplying it by the correction rate ε to obtain the final required rate ηmod of re-acceleration driving force ("the value correlated with the required driving force" in the present invention). Subsequently, the gear ratio γ of the belt CVT 4 suitable for the deceleration peak G at the current time point is determined depending upon the final required rate ηmod of re-acceleration driving force.

Furthermore, if the gear ratio γ determined thus (determined in this gear ratio control during vehicle deceleration) is smaller than the gear ratio $\gamma_0$ obtained by the previous gear ratio control during vehicle deceleration, the gear ratio γ determined in this gear ratio control during vehicle deceleration is cancelled. In other words, the gear ratio $\gamma_0$ obtained by the previous gear ratio control during vehicle deceleration is retained. This prevents an unnecessary upshift from being executed. Also, if the lateral G is equal to or larger than a predetermined value, the gear ratio $\gamma_0$ obtained by the previous gear ratio control during vehicle deceleration is retained. This prevents the gear ratio γ from increasing more than necessary (prevents the occurrence of downshift that may give the driver a feeling of strangeness).

A description will be given below of the specific procedure of the gear ratio control during vehicle deceleration in which the basic required rate η of re-acceleration driving force is corrected to obtain a final required rate ηmod of re-acceleration driving force and the gear ratio γ of the belt CVT 4 is determined based on the final required rate ηmod of re-acceleration driving force.

Figure 10:
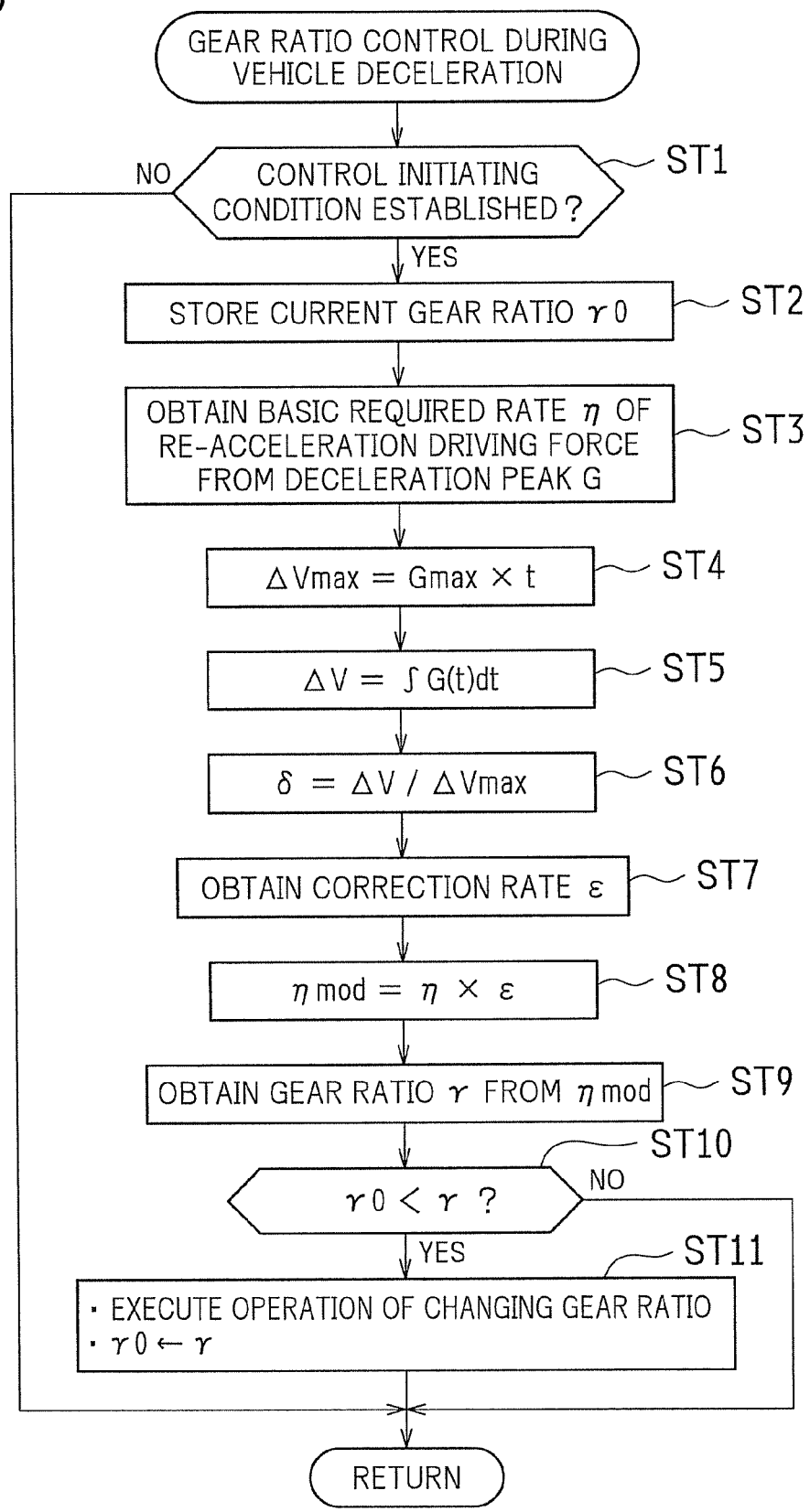
FIG. 10 is a flowchart showing the procedure of a gear ratio control during vehicle deceleration.

FIG. 10 is a flowchart showing the procedure of the gear ratio control during vehicle deceleration. This flowchart is run repeatedly every several milliseconds while the vehicle is moving.

First, in step ST1, a determination is made of whether or not a condition for initiating the gear ratio control during vehicle deceleration is established. An example of this condition for initiating the gear ratio control (hereinafter also referred to as the control initiating condition) is that the acceleration of the vehicle in the longitudinal direction (deceleration peak G) detected by the longitudinal acceleration sensor 111 reaches or exceeds a predetermined value. The predetermined value is set at, for example, a value corresponding to a certain deceleration peak G of the vehicle approaching the corner in preparation for turning around the corner (the deceleration peak G in the aforementioned section [1]), which has been obtained through experiments and/or simulations. More specifically stated, the deceleration peak G of the vehicle approaching the corner in preparation for turning around the corner generally varies depending upon the amount of depression of the brake pedal by the driver (that is, varies from driver to driver). Therefore, the predetermined value is set to a minimum within this general range of the deceleration peak G. The control initiating condition is not limited to the deceleration peak G.

The control initiating condition further includes that the lateral G is smaller than a predetermined value. Specifically, if the lateral G is equal to or larger than the predetermined value, the gear ratio control during vehicle deceleration is not executed, so that the current gear ratio γ of the CVT 4 is retained.

If the deceleration peak G is smaller than the predetermined value, it is determined that the driver does not require to decelerate the vehicle and subsequently re-accelerate it, so that there is no need to obtain the final required rate ηmod of re-acceleration driving force. Therefore, the determination in step ST1 is NO and the process is returned.

On the other hand, if the deceleration peak G is not smaller than the predetermined value and the lateral G is smaller than the predetermined value, so that the control initiating condition for the gear ratio control during vehicle deceleration is established, the determination in step ST1 is YES and the process proceeds to step ST2. In this step ST2, the current gear ratio $\gamma_0$ of the belt CVT 4 is stored. Specifically, the gear ratio $\gamma_0$ is stored in the RAM 83 of the ECU 8.

If the gear ratio control during vehicle deceleration was executed in the previous routine and the gear ratio γ was determined (the control initiating condition was established in the previous routine), the current gear ratio $\gamma_0$ is a value corresponding to the gear ratio γ in the previous routine. On the other hand, if the control initiating condition was not established in the previous routine but has been established in the current routine, the gear ratio γ currently being selected according to the shift map (FIG. 4) is stored as the current gear ratio $\gamma_0$.

Thereafter, the process proceeds to step ST3, in which the deceleration peak G at a current time point is detected by the longitudinal acceleration sensor 111. Then, the basic required rate η of re-acceleration driving force is obtained from the current deceleration peak G. An example of a method for obtaining the basic required rate η of re-acceleration driving force from the deceleration peak G is to previously store in the ROM 82 of the ECU 8 an arithmetic expression for calculating the basic required rate of re-acceleration driving force with the deceleration peak G as a variable and calculate the basic required rate η of re-acceleration driving force using the arithmetic expression. This arithmetic expression is previously obtained through experiments and/or simulations.

Figure 11:
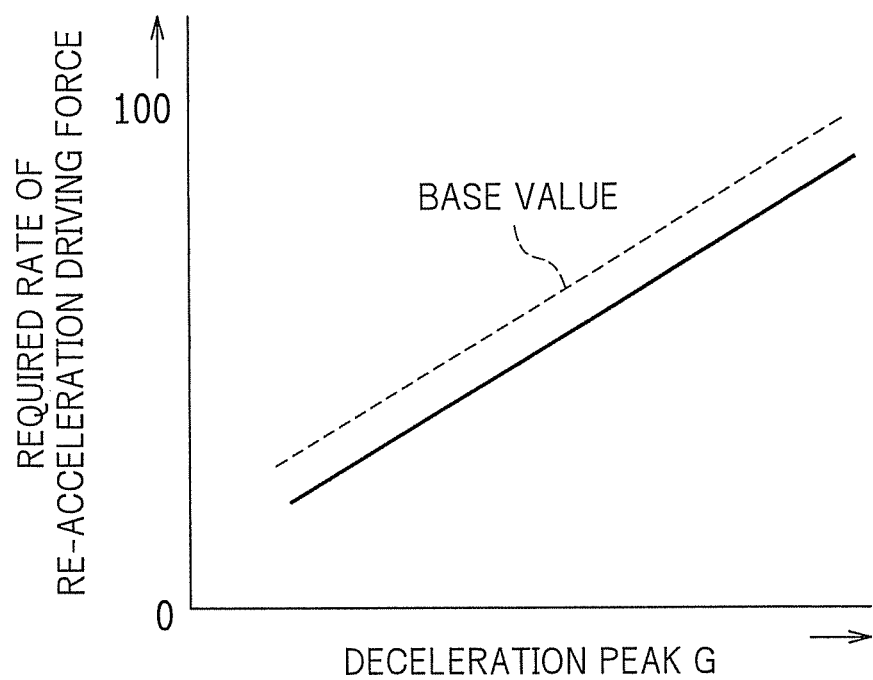
FIG. 11 is a graph showing an example of a map of required rates of re-acceleration driving force.

Another example of the method for obtaining the basic required rate η of re-acceleration driving force is to previously store in the ROM 82 of the ECU 8 a map specifying the relationship between the deceleration peak G and the required rate η of re-acceleration driving force (map of required rates of re-acceleration driving force) and extract the basic required rate η of re-acceleration driving force using the map of required rates of re-acceleration driving force. The base values indicated by the broken line in FIG. 11 are, for example, an ideal deceleration pattern on which a relatively strong intention of re-acceleration is reflected. Specifically, the broken line shows the relationship between the deceleration peak G and the required rate of re-acceleration driving force which corresponds to a deceleration pattern previously determined as a manner of deceleration when a skilled driver selects a sporty driving style. On the other hand, the solid line shows the relationship between the deceleration peak G and the required rate of re-acceleration driving force which corresponds to a commonly assumed deceleration pattern. In obtaining the basic required rate η of re-acceleration driving force, the required rate of re-acceleration driving force associated with the deceleration peak G in this commonly assumed deceleration pattern is extracted. The commonly assumed deceleration pattern may be previously obtained through experiments and/or simulations or may be set by multiplying the base values by a predetermined factor.

After the basic required rate η of re-acceleration driving force is obtained in step ST3, the process proceeds to step ST4 to calculate the maximum amount ΔVmax of vehicle speed change from the elapsed time t up to the current time point since the control initiating condition for the gear ratio control during vehicle deceleration has been established and the current maximum deceleration Gmax. Specifically, the current maximum deceleration Gmax is multiplied by the elapsed time t to calculate the maximum amount ΔVmax (=Gmax×t) of vehicle speed change. In other words, the maximum amount ΔVmax of vehicle speed change is calculated based on the assumption that the maximum deceleration Gmax in a period from the start of the gear ratio control during vehicle deceleration initiated upon the establishment of the control initiating condition up to the current time point has continued throughout the period.

Figure 12:
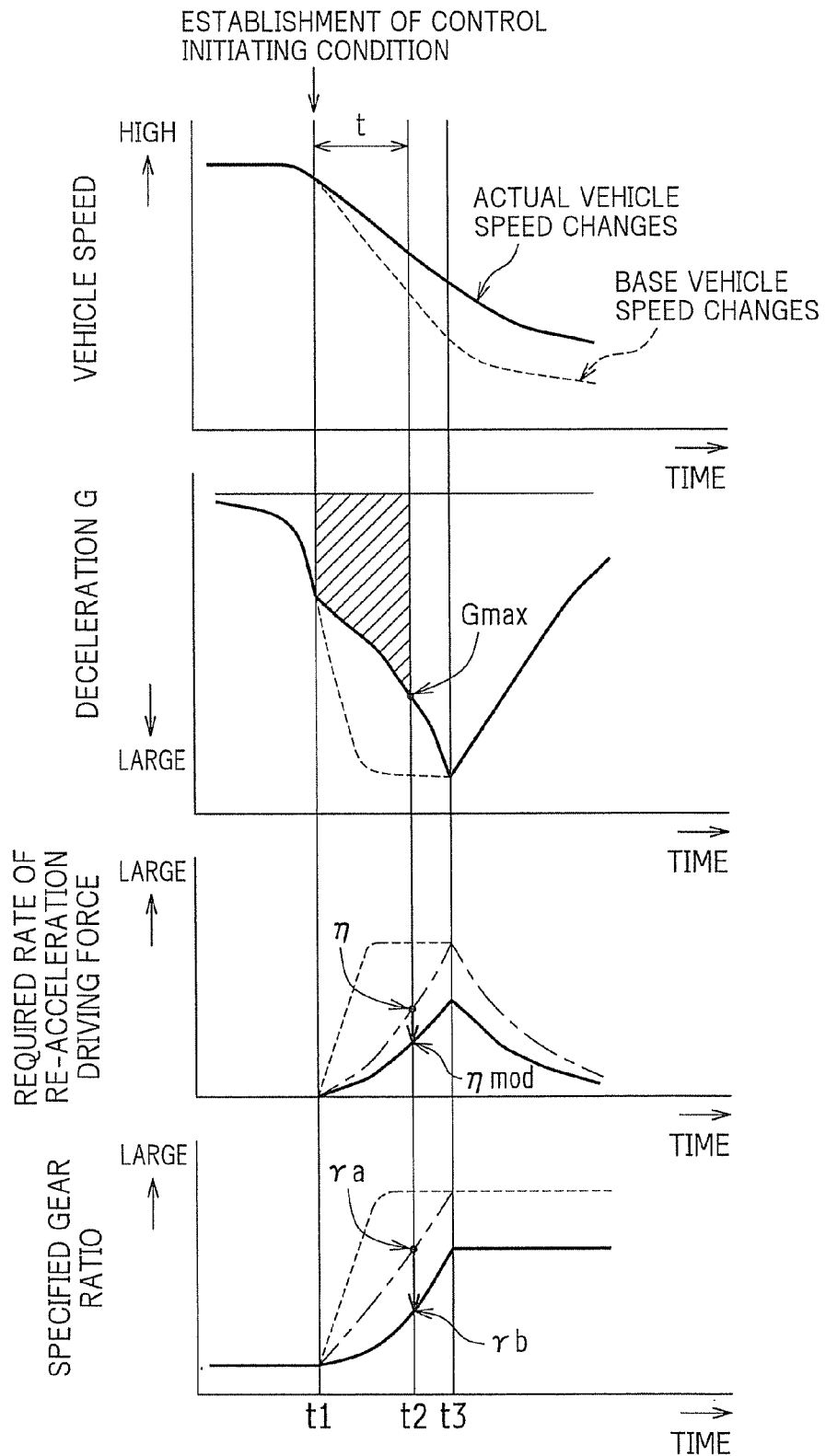
FIG. 12 is graphs showing respective examples of changes in vehicle speed, changes in deceleration G, changes in required rate of re-acceleration driving force, and changes in specified gear ratio while the vehicle decelerates.

FIG. 12 is graphs showing respective examples of changes in vehicle speed, changes in deceleration G, changes in required rate of re-acceleration driving force, and changes in specified gear ratio while the vehicle decelerates. The vehicle speed shown by the broken line in FIG. 12 refers to vehicle speed changes during deceleration in the aforementioned deceleration pattern expressed by the base values (BASE VEHICLE SPEED CHANGES). The vehicle speed shown by the solid line in FIG. 12 refers to vehicle speed changes during actual deceleration targeted by this embodiment (ACTUAL VEHICLE SPEED CHANGES).

Furthermore, the deceleration G shown by the broken line in FIG. 12 refers to changes in deceleration peak G during vehicle deceleration in the deceleration pattern expressed by the base values and the deceleration G shown by the solid line refers to changes in deceleration peak G during actual vehicle deceleration targeted by this embodiment. Here, a description is given of the case of obtaining the final required rate ηmod of re-acceleration driving force at the timing t2 in FIG. 12 to determine the gear ratio γ of the belt CVT 4. In FIG. 12, the deceleration peak G reaches the predetermined value at the timing t1. Therefore, at the timing t1, the control initiating condition is established and the gear ratio control during vehicle deceleration is initiated.

As described previously, the maximum amount ΔVmax of vehicle speed change calculated in step ST4 is an amount of speed change based on the assumption that the deceleration Gmax at the current time point (t2 in FIG. 12), i.e., the maximum deceleration Gmax, has continued from the establishment of the control initiating condition up to the current time point.

After the maximum amount ΔVmax of vehicle speed change is calculated in this manner, the process proceeds to step ST5 to calculate the integral amount ΔV of vehicle speed change over the elapsed time t from the establishment of the control initiating condition up to the current time point (a period from the timing t1 to the timing t2 in FIG. 12). Specifically, deceleration changes from the establishment of the control initiating condition up to the current time point are integrated over time to calculate the integral amount ΔV (=∫G(t)dt) of vehicle speed change.

The integral amount ΔV of vehicle speed change in step ST5 is calculated as a time-integrated amount of deceleration change up to the current time point (time point t2 in FIG. 12), which corresponds to the hatched area in Deceleration G graph in FIG. 12.

After the integral amount ΔV of vehicle speed change is calculated in the above manner, the process proceeds to step ST6 to calculate the reference correction amount δ as the ratio of the integral amount ΔV of vehicle speed change to the maximum amount ΔVmax of vehicle speed change.

Thereafter, the correction rate $\epsilon$ is obtained from the reference correction amount $\delta$. An example of a method for obtaining the correction rate $\epsilon$ is to previously store in the ROM 82 of the ECU 8 an arithmetic expression for calculating the correction rate $\epsilon$ with the reference correction amount $\delta$ as a variable and calculate the correction rate $\epsilon$ using the arithmetic expression. This arithmetic expression is previously obtained through experiments and/or simulations. Another example of the method for obtaining the correction rate $\epsilon$ is to previously store in the ROM 82 of the ECU 8 a map specifying the relationship between the reference correction amount $\delta$ and the correction rate $\epsilon$ (correction rate map) and extract the correction rate $\epsilon$ using the correction rate map. This correction rate map is also previously obtained through experiments and/or simulations.

Thereafter, the process proceeds to step ST8 to calculate the final required rate $\eta$mod of re-acceleration driving force from the basic required rate $\eta$ of re-acceleration driving force and the correction rate $\epsilon$. Specifically, the basic required rate $\eta$ of re-acceleration driving force is multiplied by the correction rate $\epsilon$ to calculate the final required rate $\eta$mod of re-acceleration driving force ($=\eta \times \epsilon$).

More specifically, the basic required rate $\eta$ of re-acceleration driving force shown by the dash-single-dot line in FIG. 12 (the basic required rate $\eta$ of re-acceleration driving force at the timing t2) is corrected by the correction rate $\epsilon$ to obtain the final required rate $\eta$mod of re-acceleration driving force shown by the solid line (the final required rate $\eta$mod of re-acceleration driving force at the timing t2).

Thereafter, the process proceeds to step ST9 to determine the gear ratio $\gamma$ of the belt CVT 4 from the calculated final required rate $\eta$mod of re-acceleration driving force. Specifically, a map specifying the relationship between the final required rate $\eta$mod of re-acceleration driving force and the gear ratio $\gamma$ of the belt CVT 4 (gear ratio map) is previously stored in the ROM 82 of the ECU 8 and the gear ratio $\gamma$ of the belt CVT 4 is extracted using the gear ratio map. This gear ratio map is previously obtained through experiments and/or simulations.

Thus, the gear ratio corresponding to the basic required rate $\eta$ of re-acceleration driving force (gear ratio $\gamma$a at the timing t2 on the gear ratio transition curve shown by the dash-single-dot line in FIG. 12) is changed to a specified gear ratio corresponding to the final required rate $\eta$mod of re-acceleration driving force (gear ratio $\gamma$b at the timing t2 on the gear ratio transition curve shown by the solid line in FIG. 12).

After the gear ratio $\gamma$ ($=\gamma$b) of the belt CVT 4 suitable for the deceleration peak G at the current time point is determined in the above manner, the process proceeds to step ST10. In step ST10, the gear ratio $\gamma$ determined in the current control (determined in step ST9 in the current routine) is compared with the currently in-use gear ratio $\gamma_0$ of the belt CVT 4. Specifically, it is determined whether or not the gear ratio $\gamma$ determined in the current control is larger than the in-use gear ratio $\gamma_0$ (whether or not the gear ratio $\gamma$ determined in the current control is on the downshift side with respect to the in-use gear ratio $\gamma_0$).

If the gear ratio $\gamma$ determined in the current control is not larger than the in-use gear ratio $\gamma_0$ (the gear ratio $\gamma$ determined in the current control is equal to or on the upshift side with respect to the in-use gear ratio $\gamma_0$), the determination in step ST10 is NO and the process is returned. In other words, the gear ratio $\gamma$ is not updated and the currently in-use gear ratio $\gamma_0$ is retained. This prevents an unnecessary upshift from being executed.

On the other hand, if the gear ratio $\gamma$ determined in the current control is larger than the in-use gear ratio $\gamma_0$ (the gear ratio $\gamma$ determined in the current control is on the downshift side with respect to the in-use gear ratio $\gamma_0$), the determination in step ST10 is YES and the process proceeds to step ST11. In step ST11, an operation of changing the gear ratio is executed. Specifically, the gear ratio of the belt CVT 4 is changed from the gear ratio $\gamma_0$ to the gear ratio $\gamma$. Thus, the gear ratio of the belt CVT 4 is shifted down.

More specifically, as described previously, the shift control solenoid (DS2) 305 (see FIG. 2) is actuated and the control hydraulic pressure output from the shift control solenoid (DS2) 305 is thus provided to the second hydraulic port 316 of the upshift control valve 301. Thus, the spool 311 is moved toward the downshift position side (the lower side in FIG. 2) by a thrust depending upon the control hydraulic pressure. By this movement of the spool 311 (toward the downshift position side), the working fluid in the hydraulic actuator 413 of the primary pulley 41 flows, in a flow volume corresponding to the control hydraulic pressure, into the input/output port 314 of the upshift control valve 301. The working fluid having flowed into the upshift control valve 301 passes through the output port 317 and the input/output port 324 of the downshift control valve 302 and is then discharged through the discharge port 325. Thus, the shift control pressure is reduced, so that the width of the V-groove of the primary pulley 41 is increased to increase the gear ratio $\gamma$.

Furthermore, in step ST11, the gear ratio $\gamma$ determined in the current control is set as the gear ratio $\gamma_0$. In other words, the gear ratio $\gamma$ determined in the current routine is set to be a previous value in the next routine (the gear ratio $\gamma_0$ determined in the previous routine).

By repeating the above procedure, the gear ratio gradually increases while the gear ratio $\gamma$ of the belt CVT 4 is determined at every specified interval based on the final required rate $\eta$mod of re-acceleration driving force obtained by correcting the basic required rate $\eta$ of re-acceleration driving force obtained from the deceleration peak G.

As thus far described, the integral amount $\Delta$V of vehicle speed change over the elapsed time t from the establishment of the control initiating condition for the gear ratio control during vehicle deceleration up to the current time point corresponds to the amount of vehicle speed change from the establishment of the control initiating condition based on the deceleration peak G up to the current time point and reflects how the driver has decelerated the vehicle. In other words, it reflects the driver's intention of deceleration. Therefore, in this embodiment, the gear ratio $\gamma$ of the belt CVT 4 meeting the driver's intention of re-acceleration can be obtained by correcting the basic required rate $\eta$ of re-acceleration driving force according to the driver's intention of deceleration and thus obtaining the final required rate $\eta$mod of re-acceleration driving force. In other words, the gear ratio $\gamma$ capable of meeting the target driving force at re-acceleration can be appropriately set, so that it can be reduced or even avoided that a further downshift is executed by depressing the accelerator pedal during re-acceleration. As a result, the gear ratio $\gamma$ meeting the driver's intention of re-acceleration can be appropriately set to increase the drivability at re-acceleration. For example, it can be avoided that during vehicle turning in which the lateral G is relatively large (during vehicle travel in which the longitudinal G is relatively small), the gear ratio is corrected to allow an upshift and make the vehicle behavior unstable.

Other Embodiments

While a single preferred embodiment of the present invention has thus far been described in detail with reference to the drawings, the embodiment is merely illustrative. The present invention can be implemented in any of a variety of forms in which modifications and improvements are made based on knowledge of those skilled in the art.

For example, in the above embodiment, the required rate of re-acceleration driving force is updated every time the deceleration peak G is updated. However, the present invention is not limited to this. For example, the update processing may be stopped upon transition from section [1] to section [2], i.e., upon start of turning, and the gear ratio γ at this point of time may be retained. Thus, the gear shift of the vehicle while turning can be avoided.

In the above embodiment, after the vehicle exits the corner, the retention of the gear ratio is cancelled and a normal shift control is restarted. However, the present invention is not limited to this. For example, the normal shift control may be restarted at the end of the corner. The end of the corner used herein means that the lateral G has fallen below a predetermined corner end judgment value at which the corner can be judged to have terminated.

Furthermore, in the above embodiment, a description has been given of the case where the present invention is applied to a vehicle equipped with a belt CVT 4 as the CVT. However, the present invention is not limited to this case and is also applicable to vehicles equipped with other types of CVTs, such as a toroidal CVT or a chain CVT.

In the above embodiment, the basic required rate η of re-acceleration driving force is corrected to obtain a final required rate ηmod of re-acceleration driving force and the gear ratio γ of the belt CVT 4 is determined based on the final required rate ηmod of re-acceleration driving force. However, the present invention is not limited to this. Instead of this, a basic required re-acceleration driving force (the absolute value of the required driving force, i.e., "the basic required driving force" in the present invention) may be corrected to obtain the final required re-acceleration driving force ("the required driving force to be required at re-acceleration" in the present invention) and the gear ratio γ of the belt CVT 4 may be determined based on the final required re-acceleration driving force. Specifically, the correction rate ε for the basic required re-acceleration driving force is calculated based on the maximum amount ΔVmax of vehicle speed change calculated from the deceleration peak G at the current time point and the integral amount ΔV of vehicle speed change from the start of the gear ratio control during vehicle deceleration up to the current time point ("the amount of vehicle speed change" in the present invention). Then, the basic required re-acceleration driving force is multiplied by the correction rate ε to obtain the final required re-acceleration driving force. Subsequently, the gear ratio γ of the belt CVT 4 is determined based on the final required reacceleration driving force.

In the above embodiment, the driver's intention of deceleration is estimated from the acceleration of the vehicle in the longitudinal direction (deceleration peak G) detected by the longitudinal acceleration sensor 111. However, the present invention is not limited to this. The driver's intention of deceleration may be estimated from the acceleration of the vehicle in the longitudinal direction (deceleration peak G) detected by the longitudinal acceleration sensor 111 only when the application of the foot brake can be confirmed based on an output signal from the brake pedal sensor 109. Thus, the driver's intention of deceleration can be correctly estimated.

Although not illustrated by examples, the present invention can be implemented by making various modifications without departing from the spirit of the present invention.

What is claimed is:

1. A control apparatus for a vehicle comprising a continuously variable transmission configured to transmit power from a drive power source toward a drive wheel, the control apparatus performing a gear ratio control for determining a target gear ratio of the continuously variable transmission based on a required driving force to be required at re-acceleration, the required driving force to be required at re-acceleration being set to be greater as a deceleration of the vehicle while decelerating is more increased, wherein
the control apparatus is configured to:
estimate a basic required driving force to be required at re-acceleration or a value correlated with the basic required driving force from the deceleration of the vehicle while decelerating;
correct the basic required driving force or the value correlated with the basic required driving force based on:
a maximum amount of vehicle speed change calculated by multiplication of a maximum deceleration in a period from a start of the gear ratio control initiated upon establishment of a predetermined condition for initiating the gear ratio control up to a current time point by an elapsed time from the start of the gear ratio control initiated upon the establishment of the predetermined condition for initiating the gear ratio control up to the current time point; and
an amount of vehicle speed change from the start of the gear ratio control initiated upon the establishment of the predetermined condition for initiating the gear ratio control up to the current time point to obtain the required driving force to be required at re-acceleration or the value correlated with the required driving force; and
determine the target gear ratio of the continuously variable transmission based on the required driving force to be required at re-acceleration or the value correlated with the required driving force.

2. The control apparatus for a vehicle according to claim 1, wherein the control apparatus is configured to:
calculate the amount of vehicle speed change as an integral amount of vehicle speed change from the start of the gear ratio control initiated upon establishment of the predetermined condition for initiating the gear ratio control up to the current time point;
obtain a ratio of the amount of vehicle speed change to the maximum amount of vehicle speed change;
multiply the basic required driving force or the value correlated with the basic required driving force by a correction rate calculated based on the ratio to obtain the required driving force to be required at re-acceleration or the value correlated with the required driving force; and
determine the target gear ratio of the continuously variable transmission based on the required driving force to be required at re-acceleration or the value correlated with the required driving force.

3. The control apparatus for a vehicle according to claim 1, wherein the control apparatus is configured so that if the target gear ratio of the continuously variable transmission determined based on the required driving force to be required at re-acceleration or the value correlated with the required driving force is smaller than a previously determined target gear ratio, the previously determined target gear ratio is retained.

4. The control apparatus for a vehicle according to claim 1, wherein the control apparatus is configured so that during turning of the vehicle in which the lateral acceleration of the vehicle is equal to or larger than a predetermined value, a previously determined target gear ratio is retained.

5. The control apparatus for a vehicle according to claim 1, wherein the value correlated with the required driving force is a rate of the required driving force to a maximum developable driving force at the current time point.

6. The control apparatus for a vehicle according to claim 1, wherein the condition for initiating the gear ratio control is established when the deceleration of the vehicle reaches or exceeds a predetermined value.

* * * * *